Feb. 28, 1961  J. C. SIEGRIST  2,972,776
MOULDING APPARATUS

Filed Aug. 20, 1956  3 Sheets-Sheet 1

Feb. 28, 1961 J. C. SIEGRIST 2,972,776
MOULDING APPARATUS
Filed Aug. 20, 1956 3 Sheets-Sheet 3
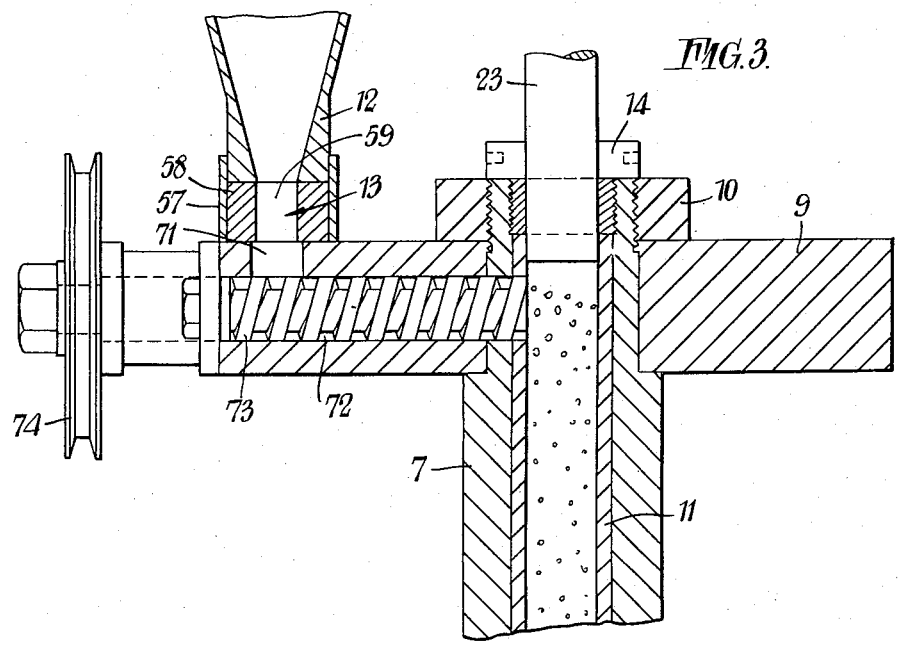
FIG. 3.
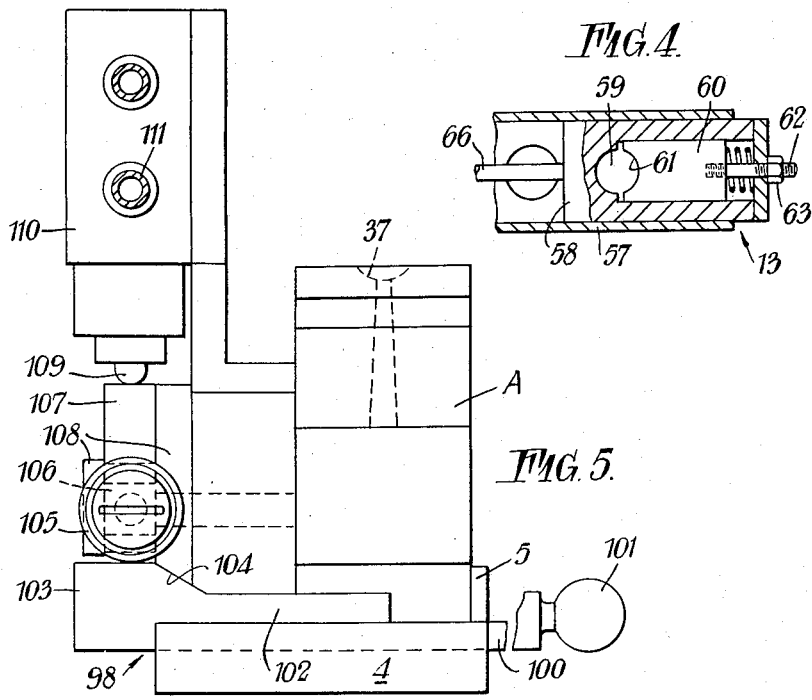
FIG. 4.
FIG. 5.

United States Patent Office 2,972,776
Patented Feb. 28, 1961

2,972,776
MOULDING APPARATUS

John Christian Siegrist, Case Postale 50, Delemont, Jura Bernois, Switzerland, assignor of one-half to Georges Ceppi, Bassecourt, Jura Bernois, Switzerland Filed Aug. 20, 1956, Ser. No. 605,073

6 Claims. (Cl. 18—30)

This invention relates to moulding apparatus and more particularly, but not exclusively, to apparatus for the injection moulding of synthetic plastic materials such as nylon.

An object of the invention is to provide moulding apparatus comprising members adapted to support a mould during a moulding operation, injection means including an injection nozzle for injecting moulding material into a mould, and valve means for closing said injection nozzle and operable when moulding material is subjected to a predetermined injection pressure, to open the injection nozzle to permit injection to be effected at the required injection pressure.

A further object of the invention is to provide moulding apparatus comprising an injection press having relatively displaceable press members adapted to engage and press together co-operating parts of a mould during a moulding operation, injection means including an injection nozzle adapted to inject moulding material into a mould when the latter is engaged between the press members, valve means for closing the injection nozzle until a predetermined injection pressure is reached, and manually controlled means, or means operatively connected to said injection means, for controlling operation of said valve means, the arrangement being such that when a mould is applied to the injection nozzle, injection of moulding material into the mould can be restrained by valve means until the material is subjected to the predetermined injection pressure, whereupon the valve means is operated automatically, or at will under the action of the manually controlled means, to open the injection nozzle to permit injection of the material into the mould at the required injection pressure.

The moulding apparatus may also include means for opening and closing the mould parts, and means for transferring assembled moulds to and from the injection press.

Figure 1:
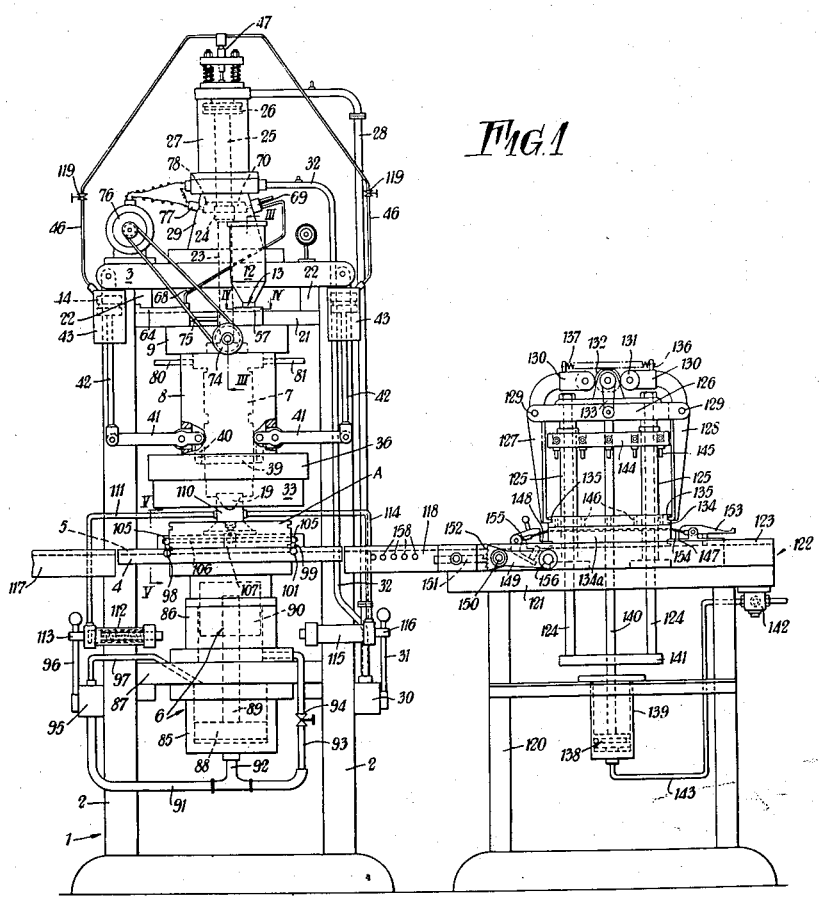
Figure 2:
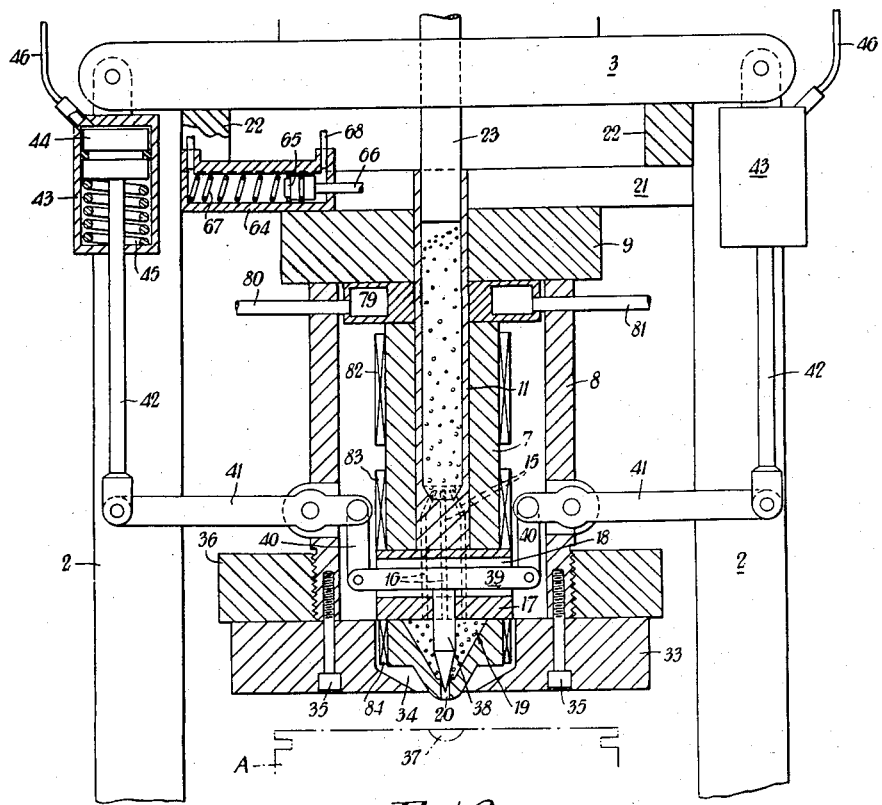
Figure 6:
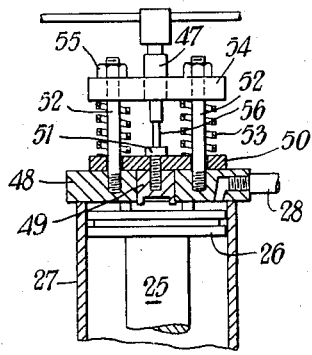

For a better understanding of the invention and to show how it may be carried into effect, the same will now be described, by way of example, with reference to the accompanying drawings, in which:

Figure 1 is a front view, partly in section, of a portion of the moulding apparatus, Figure 2 is an enlarged detail view of a part of Figure 1, Figure 3 is an enlarged detail view in section, taken along the line III—III of Figure 1, Figure 4 is an enlarged detail view taken along the line IV—IV of Figure 1, Figure 5 is an enlarged detail view taken along the line V—V of Figure 1, and, Figure 6 is an enlarged sectional detail view of part of Figure 1.

The embodiment illustrated in the drawings comprises moulding apparatus for use more particularly in the moulding of sliding clasp fasteners employing moulds of the kind disclosed in British Patent No. 605,708.

The apparatus includes a vertical injection moulding press having a frame 1 formed with upright columns 2 which support an upper plate 3 and a lower movable table 4 displaceable relatively to the upper plate. In the present embodiment, the lower table 4 carries a flanged or channel guide 5 for a zip-fastener mould, shown in position at A, the lower table being adapted to be raised and lowered by hydraulic or other power means indicated generally at 6.

The press includes an injection cylinder 7 which is arranged within a cylindrical housing 8, the injection cylinder 7 having an upper reduced portion which extends through a top part 9 of the housing and is secured thereto by a nut 10 (Figure 3). The injection cylinder 7 is provided internally with a removable and interchangeable injection tube 11 to which moulding material, e.g., nylon, is fed from a container 12 by feed means indicated generally at 13. The tube 11 is held removably in the injection cylinder 7 by a threaded member 14 (Figure 3) screwed into the upper end of cylinder 7 and engaging the top of the injection tube. The lower end portion of the tube is formed with a series of outlet passages 15 which register with corresponding passages 16 formed in a bottom part 17 of the cylinder 7. The passages 16 are disposed on opposite sides of a diametral open-ended slot or passage 18 in the bottom part 17 and provide communication between the interior of tube 11 and the interior of an injection nozzle 19 secured to bottom part 17 and formed with an outlet orifice 20. The bottom part 17 thus forms a spacer between the lower end of the tube 11 and the nozzle 19. The top part 9 of the cylindrical housing 8 is secured to a support 21 extending between columns 2 and secured through blocks 22 to the top plate 3. Within the injection tube 11 there slides an injection plunger 23 secured by a coupling 24 to the lower end of a rod 25 connected to a piston 26 slidable in a cylinder 27 and adapted to be displaced by hydraulic fluid or air under pressure introduced into the cylinder through supply pipe 28. The cylinder 27 is mounted upon a frame 29 above the plate 3. The pressure supply pipe 28 is controlled by a valve 30 connected, in the present embodiment, to a source of oil under pressure (not shown) and actuated by a manual operating lever 31, the valve 30 also being connected by a pipe 32 to the lower part of the cylinder 27 to provide for the upward return movement of piston 26 and of the injection plunger. The cylindrical housing 8 is fitted with a bolster-plate 33, the latter having a central opening 34 through which the injection nozzle 19 protrudes. The bolster-plate 33 is arranged to be fixed adjustably to the cylindrical housing by counter-sunk screws 35, the position of the bolster-plate being adjusted by an internally threaded adjusting ring 36 screwed onto an externally threaded portion of housing 8. The arrangement is such that upon slackening the fixing screws 35, the adjusting ring 36 can be rotated so as to move the bolster-plate 33 up or down to bring the bolster-plate to the correct height relatively to the end of the injection nozzle thereby to ensure that when the mould is raised, the nozzle 19 will accurately engage a nozzle-seat 37 in the upper part of the mould, for injection of the moulding material. After adjustment of the bolster-plate the latter can be screwed into tight abutting relation with the adjusting ring.

The injection nozzle 19 is provided internally with an axially displaceable needle valve 38 having a conical end part adapted to control the flow of moulding material through the nozzle outlet. The needle valve is normally downwards to close the nozzle outlet, by actuating means comprising a rod or bar 39 which engages or is fixed to, the upper end of the needle valve and which passes through the slot 18 in the lower part of the injection cylinder, the opposite ends of rod 39 being pivoted to links 40 pivotally mounted on the inner ends of levers 41 which latter are pivoted in lugs on opposite sides of the cylindrical housing 8. The outer end of each lever 41 is connetced to a rod 42 of an air pressure operated device having a cylinder 43 fitted with a piston 44 mounted on the associated rod 42, and each cylinder houses a return spring 45 acting on the piston 44. The cylinders 43 are connected by conduits 46 to an adjustable air pressure control valve 47 disposed at the top of the main cylinder 27 and connected to an air supply line (not shown).

As shown in Figure 6, the main cylinder 27 has a cover 48 to which pressure supply pipe 20 is connected, and the cover is bored to receive a piston 49 secured to a plate 50 by a bolt 51, the plate being freely slidable on upright rods 52 carried by the cover and passing through springs 53. The rods also pass through an upper plate 54 and are screw-threaded to receive nuts 55 adapted to provide for adjustment in the downward pressure applied by springs 53 to the lower plate and the piston 49. The upper plate supports the control valve 47 which is fitted with an axially adjustable valve needle 56 adapted to be engaged and raised by bolt 51 upon lifting of piston 49 by oil under pressure introduced into cylinder 27 to depress piston 26 and the injection plunger 23. Upon opening of valve 47 by lifting of piston 49, air under pressure passes to the cylinders 43 to depress pistons 44 whereupon bar 39 is raised so that moulding material in the nozzle, compressed by plunger 23, acts upon and lifts the needle valve 38 to open the nozzle outlet so that material is injected into the mould under high-pressure. Thus, by appropriate adjustment of springs 53 and of the valve needle 56, the injection pressure can be predetermined as required, and the needle valve in the nozzle is held positively in the closed position until full injection pressure is bulit up in the injection cylinder. Immediately following the opening of the nozzle outlet at the commencement of injection, any momentary loss of pressure above piston 26 due to the passage of moulding material through the nozzle outlet, can automatically be compensated by downward movement of piston 49 under the action of springs 53, and piston 49 therefore operates as a pressure accumulator which ensures that throughout the whole of the injunction period, the required injection pressure is maintained in cylinder 27 above the piston 26.

The feeding means 13 for the moulding material comprises a casing 57 mounted on the top part 9 of the housing 8, the casing having a slide 58 formed with a recess 59 forming a measuring device into which a predetermined amount of moulding material can pass from the container 12. The size of the recess 59 can be regulated according to the amount of moulding powder required for each stroke of the press by means of an adjusting member 60 having at its inner end a cut-out 61 which defines a part of the recess, there being at the outer end of the adjusting member a threaded stem 62 carrying adjusting nut means 63 so arranged as to permit the adjusting member to be moved longitudinal of the slide thereby to effect the required regulation in the size of the recess 59. The slide is moved by means of an air-pressure operated device 64 (Figure 2) having a piston 65 connected by a rod 66 to the slide, the piston normally being urged by a spring 67 into a position in which the slide is located with the recess 59 in register with the outlet of the container 12. Air under pressure is admitted to the device 64 through a pipe 68 controlled by valve 69 having an operating pin adapted to be actuated by a movable cam contact 70 mounted on piston rod 25, the arrangement being such that when the injetcion plunger 23 is at the top of its stroke the valve 69 is held open so that the piston device 64 urges the slide in to a position in which the recess 59 registers with a passage 71 (Figure 3) communicating with a bore 72 which is formed in the top 9 of the cylindrical housing, and in which is mounted a helicoidal, or screwed, feed spindle 73. The feed spindle is rotated through a pulley 74 and belt 75, by an electric motor 76 controlled by a switch 77 arranged to be operated by a movable contact 78 on the piston rod 25, so that the feed spindle is rotated when the injection plunger is at the top of its stroke. Thus, each time the injection plunger reaches its upper position, the slide delivers a predetermined amount of moulding powder to the feed spindle, and the latter is rotated to feed the powder into the injection tube 11.

The material container may comprise two compartments which can be used alternately. The container can be hermetically closed and connected to a vacuum pump, and electrical heating means may be provided to maintain the moulding material at a temperature of between 60 and 80 degrees degrees centigrade. In this manner, most of the moisture contained in the moulding material may be extracted by heat and by the vacuum pump, the drying of the moulding material being of particular importance when nylon and similar plastic materials are to be employed. Within the cylindrical housing 8, there is arranged around the upper part of the injection tube an annular water-cooling chamber 79 having an inlet 80 and an outlet 81 for controlling the temperature of the adjacent part of the injection tube. The injection cylinder 7 is surrounded by two electrical heating elements 82, 83 located below the chamber 79, and a similar heating element 84 is provided around the nozzle, these heating elements being adapted to heat and maintain the temperature of the moulding powder during the injection process.

In the present embodiment, the power means 6 for raising and lowering the table 4 comprises a pair of hydraulic ram cylinders 85 and 86, the cylinder 85 being secured to the underside of a support 87 mounted on columns 2, and the upper cylinder 86 being mounted on top of the support 87. The lower cylinder has a piston 88 connected by piston rod 89 to piston 90 in the upper ram cylinder, the piston 90 being secured to the movable table 4. For the purpose of actuating the ram pistons to raise the table 4, oil under pressure is introduced to the lower ends of cylinders 85 and 86 through a supply pipe 91 having a connection 92 with cylinder 85 and having an extension 93 which communicates through a shut-off valve 94 with cylinder 86. The flow of oil through the supply pipe is controlled by a valve 95 actuated by a manually operated lever 96 and connected to a source (not shown) of hydraulic pressure. The valve 95 is also connected by a pipe 97 with the upper part of cylinder 85, so that by actuation of lever 96 a reverse flow of oil can be produced to effect lowering of the ram pistons and of the movable table 4.

The channel-guide 5 for the mould is provided with stop means adapted, when an assembled mould is slid along the guide 5 from either side of the press, properly to locate the mould so as to centralise the seating 37 of the sprue opening, with the injection nozzle.

The mould locating stop means comprises, in the present embodiment, two stop members 98, 99, spaced apart according to the length of the mould to be used, each member being arranged for sliding displacement along a groove extending transversely of the channel guide, and each including a forepart 100 which is fitted with a hand-knob 101 and which in height is substantially the same as the depth of the associated groove, an intermediate abutment part 102, and a near raised part 103 which latter provides a cam rise 104. The arrangement is such that when a stop member is pushed rearwardly into a retracted position, the abutment part 102 will be located rearwardly of the channel guide so that a mould can be slid along the guide over the part 100 disposed in the slot, and when the stop member is pulled into a forward position, the abutment part 102 will extend into the guide to form an abutment engageable by an end face of the mould. In the forward position of each stop member, the part 103 thereof is adapted to lift a roller 105 at one end of a lever 106 pivoted at its centre to a slide block 107 displaceable in a vertical slideway 108, the block being so arranged that when the rollers at both ends of lever 106 are lifted by the raised parts of the associated stop members, the block lifts a pin 109 to open an air pressure valve 110 to permit air under pressure to pass through a pipe 111 to a piston-cylinder 112 whose piston is normally urged by a spring into a position such that a rod 113 connected to the piston engages and locks the hydraulic valve control lever 96 in a "shut-off" position. When the air-pressure valve 110 is opened, the piston in cylinder 112 is moved to release the control lever 96. The air-pressure valve 110 is also connected through pipe 114 to a piston cylinder 115, similar to cylinder 112 and having a piston rod 116 adapted when the valve 110 is closed to lock the injection control valve lever 31, in "shut-off" position and to be retracted to release lever 31 when valve 110 is opened. Thus, before the valves 30 and 95 can be actuated for operation of the press, both of stop members 98 and 99 must be in their forward mould-engaging positions.

The operation of the apparatus so far described will now be indicated.

With the control levers 31 and 96 in the vertical "off" positions shown in Figure 1, the table 4 will be in its lowered position so that the channel guide 5 is in register with similar guides 117 and 118 extending respectively to mould opening and closing apparatus located on opposite sides of the press, the mould opening and closing apparatus on the right-hand side only being shown in Figure 1. The electrical heating elements 82 to 84 are switched on and a prepared mould A is moved along the guide 117 or 118 into a central position on guide 5 as determined by one or other of the stop members 98 or 99 previously positioned to engage the leading end of the mould, according to the direction from which the mould is slid onto the press. The second stop is moved into position to locate the mould and thereupon the valve 110 is opened and the piston rods 113, 116 moved to release the control lever 31, 96. It is assumed that the recess in the feed slide 58, previously adjusted according to the amount of moulding powder required, has already been charged with powder from the container 12, and the injection plunger 23 is in its upper position so that the feed control valve 69 is held open and the motor switch 77 is closed by the co-operating contacts 70 and 78 respectively. Thus, when air-pressure and electrical supplies are connected, motor 76 will be operated to rotate the feed spindle 73, and the slide 58 is displaced to transfer the measured quantity of moulding powder to the spindle which latter conveys the powder to the injection tube 11.

Whilst the powder is being heated in the injection tube, initial adjustments can be made to bring the bolster 33 into the required position according to the height of the mould. For this purpose, the hydraulic control lever 96 is actuated to permit oil under pressure to flow into ram cylinders 85 and 86 to raise the press table 4 and the mould, the adjusting ring 36 then being screwed onto or off the cylindrical housing until the nozzle properly engages in the seating 37 with the top face of the mould abutting the bolster. When properly adjusted, the bolster is tightened firmly against ring 36 by the tightening screws 35 thereby to form a solid connection between the bolster and the cylindrical housing. It will be understood that once these initial adjustments have been made, the press may be used successively with other similar moulds without necessarily readjusting the bolster.

With the nozzle engaged in the seating 37, the injection operation is effected by moving lever 31 to open valve 30 so that oil under pressure flows into the main cylinder 27, and plunger 23 is displaced downwardly to compress and urge the moulding powder towards the nozzle outlet. At the same time, valve piston 49 in the top of cylinder 27 is raised and when the required injection pressure is reached, as determined by adjustment of springs 53 and valve 47, the latter valve opens so that air under pressure flows into and actuates the piston cylinders 43 and the associated link and lever mechanisms are operated to lift rod 39 so that the needle valve 38 can be lifted by pressure of moulding material in the nozzle, to open the nozzle outlet 20. As previously explained, any momentary drop of pressure in cylinder 27 due to an initial passage of material through the nozzle outlet, can be compensated by downward movement of piston 49, and thus the whole of the injection stage can be carried out under the desired high pressure. As the injection plunger moves downwards, the cam 70 and electrical contact 78 are displaced to close valve 69 so that the slide 58 is returned by spring 67 for recharging with moulding powder, and the shut-off electric motor 76.

Following completion of the injection, lever 31 is actuated to produce a return flow of oil pressure to raise piston 26 and plunger 23, whereupon cam 70 re-engages and opens valve 69 and contact 78 again closes switch 77, to commence the feeding of the moulding material for the next injection cycle. Control lever 96 is also operated to cause oil under pressure to flow into the upper part of cylinder 85 so that the hydraulic ram pistons lower the table 4 and the mould to their initial positions. The stop members are then retracted so that the mould can be slid to the appropriate mould opening apparatus and the valve 110 is closed permitting rods 113, 116 of piston cylinders 112, 115 to re-engage and lock the associated control levers 96, 31. The press is now ready to receive a freshly prepared mould from the opening and closing apparatus at the opposite side of the press, for the next moulding operation.

If desired, the lower ram cylinder 86 only may be subjected to hydraulic pressure for raising the mould, by closing the shut-off valve 94 in the pipe extension 93. Moreover, the pipe connections to the ram cylinders 85 and 86 could be so arranged that either one of the cylinders could be operated independently of the other, thus permitting raising of the mould under different hydraulic pressure, as required.

The injection plunger 23 may readily be detached from the piston rod 25 by releasing the coupling 24, so that injection tube 11 be withdrawn from cylinder 7. A fresh injection tube may then be inserted for use with moulding material of a different colour; or a tube of smaller or larger internal bore may be inserted together with a corresponding injection plunger for moulding at a different injection pressure.

In the illustrated embodiment, the needle valve 38 is separate from the bar 39 and when the latter is raised, the needle valve is freely floating and movable into open position by pressure of moulding material in the nozzle. If desired, the needle valve may be fixed to bar 39 so that the needle valve will be moved by the bar into both its open and closed position. The stop means for locating moulds on the guides 5 may comprise more than two stop members, the several stop members being spaced apart along the guide for use with moulds of different length. Moreover, manually operable valves 119 may be provided in the air pressure supply pipes 46 at points between the valve 47 and the cylinders 43, or connections could be made at these points to an auxiliary supply of air pressure under a control of a single valve, to permit the piston cylinders 43 and the associated nozzle valve opening and closing mechanism to be operated manually independently of the valve 47, such an arrangement facilitating, for example, the necessary adjustments for presetting of the injection pressure. The fluid pressure operated devices for actuating the link and lever mechanisms of bar 39, may be replaced by mechanical operating means such as a lever or other mechanical system which can, for example, be operatively connected to the injection plunger or other actuating means.

The mould opening and closing apparatus on opposite sides of the injection press are similar in form and thus the following description of one will apply to both. Each apparatus is adapted, in the present embodiment, to provide for the opening and closing of a two part mould for the production of sliding clasp fasteners, the mould being similar to that disclosed in the aforesaid British patent specification. Referring to Figure 1, each apparatus comprises a frame 120 supporting a table 121 upon which there is mounted a channel-shaped slide-way 122 having transversely spaced side flanges one of which is shown at 123, the slide-way forming an extension of the channel guide 118, and being so disposed that a mould on the guide-way can be passed either manually or by power means, to and from the press. The apparatus includes two upright posts 124 slidable in hollow columns 125 mounted on table 121 and supporting a cross-head 126 having depending side arms 127 and 128 mounted for rocking motion about pivots 129 located intermediate the ends of the arms 127, 128. Above the pivots, the arms are formed with inwardly directed parts 130 carrying cam following rolls 131 which engage a centrally located cam 132 rotatable by a crank-handle 133 so that the lower ends of the arms 127, 128 can be moved into and out of gripping relation with the upper part 134 of a mould, the lower ends of the two arms being formed with inwardly directed projections 135 adapted to engage in corresponding grooves formed in the end faces of the upper mould part. The parts 130 of the arms are formed with lugs 136 between which extends a spring 137 arranged to urge the parts 130 together. In the present embodiment, the cross-head 126 is arranged to be raised and lowered by means of a hydraulic ram 138, but this movement could be effected either by hand or by the other mechanical means.

The ram comprises a cylinder 139 secured to a supporting plate of the frame 120 and has a piston mounted on a rod 140 passing upwardly through a cross-member 141 connecting the lower ends of the posts 124. The upper end of the piston rod is connected to the cross-head 126 so that when a control valve 142 is opened, oil under pressure can flow through pipe 143 into cylinder 139 to lift the piston and thereby move the cross-head from the lower position shown in Figure 1 to an elevated position. The columns 125 support a plate 144 fixed in relation to the cross-head and provided with depending ejector pins 145 which, when the upper mould part reaches its uppermost position, are adapted to pass through holes 146 thereby to eject the moulded fastener elements.

At the end of the channel slide-way 122 remote from the press, there is provided a fixed stop 147 which is engaged by the mould as it is brought into position beneath the gripping arms 127, 128, the fixed stop 147 having a projecting part which extends transversely of the guide-way and which is adapted to engage in a slot formed in the leading end-face of the lower mould part 134a. A movable stop 148 is mounted in the channel slide-way, the movable stop having a transverse projection adapted to engage a slot formed in the trailing end face of the lower mould part so as properly to locate the mould beneath the gripping members. The movable stop is rotatable about a cross-shaft 156 by a lever 149 having a handle 150 and located on the outside of the slide-way so that the stop 148 can be swung downwardly clear of the lower part of the mould when the mould is to be moved along the slide-way to and from the injection press. The stop 148 is adapted to be held firmly in engagement with the mould by a pawl 151 which engages a ratchet segment 152 at the end of lever 149. When the projections of the two stops are engaged in the co-operating slots in the lower part of the mould, the latter will be held firmly in position so that the upper part can be gripped and raised by the arms 127, 128.

The fixed stop 147 carries a spring-pressed clamp 153 adapted, in the present arrangement, to grip the adjacent end of a length of tape 154 which is placed in the mould and upon which the fastener elements are to be moulded, the opposite end of the tape being gripped by a similar clamp 155 provided on the movable stop 148. The clamp 153 is arranged for sliding displacement longitudinally of the slide-way under the action of an adjusting spring tensioning device so arranged that when the tape is gripped between the clamps, the tape will be properly tensioned as the upper part of the mould is lowered into position upon the lower part.

In operation, each mould, after an injection moulding operation, is slid either manually or by power means from the press along the slide-way until its leading end engages the fixed stop 147, the movable stop 148 being in an inoperative position depending from the cross-shaft 156 below the slide-way. The movable stop is then engaged with the trailing end of the lower part of the mould, by raising lever 149 so that the projection of the stop engages the co-operating slot in the mould, the lever being held in the engaged position by the pawl and ratchet device. The raised cross-head 126 is lowered by opening valve 142 and the crank handle 133 is then rotated into the position of Figure 1 to cause the cam 132 to press the rollers 131 apart so that the lower ends of the depending arms 127, 128 are swung inwardly to bring their projections 135 into engagement with the slots in the opposite ends of the upper mold part 134. The cross-head is then raised by reversing valve 142 thereby to lift the upper mould part whereupon the ejector pins 145 eject from the upper mould part the moulded fasteners together with the core members from which the fastener elements are subsequently stripped. A fresh length of tape is then positioned in the lower mould part and appropriately tensioned by the clamping means 153 and 155. A fresh core is then inserted and the upper mould part is lowered and properly positioned on the lower mould part. The crank lever 133 is then rotated to disengage the arms 127, 128 and the valve 142 operated to lift the arms clear of the mould. The clamps are then released and pawl 151 disengaged from ratchet 152 to permit the movable stop 148 to be swung into its inoperative position to allow the assembled mould to be passed along the slide-way to the press for the next moulding operation.

Electrical heating elements 158 are provided in the channel guide 118 between the movable stop 148 and the press, so that the mould after being assembled and before being transferred to the press, can be warmed.

It will be appreciated that the mould opening and closing apparatus on the left hand side of the press may be identical with that shown on the righthand side of Figure 1, but certain of the parts thereof will be appropriately orientated.

It will be understood that the mould opening and closing apparatus may readily be modified for operation with moulds for the production of other articles, such as the covering of electrical components with nylon and the like, the apparatus facilitating opening and closing of the mould parts and the insertion between the co-operating faces of the appropriate cores and/or other elements which are to be embedded in the moulded articles.

If desired, more than two mould opening and closing apparatus may be used with a single press; for example, two of such apparatus may be arranged on each side of the press, the apparatus on each side being inclined at an angle to each other. In such an arrangement, a generally Y-shaped slide-way junction may be pivotally arranged between the press and each pair of mould opening and closing apparatus, so that by swinging the junctoin slideway about its pivot, assembled moulds may be passed selectively between either one of said apparatus and the press.

What I claim is:

1. Injection moulding apparatus comprising press members for supporting a mould during a moulding operation, injection means including an injection tube for the reception of moulding material, an injection nozzle co-axial with said tube for injecting moulding material into a mould, a plunger device movable axially in said injection tube for compressing moulding material and urging said material from said tube into said injection nozzle, fluid pressure means for actuating said plunger device to force moulding material through said injection nozzle at a required injection pressure, a valve element guided for displacement axially within said injection nozzle to control the passage of moulding material through said nozzle, holding means for holding said valve element in its closed position, and control means operatively connected to said holding means for controlling operation of said holding means, said control means being operable to release said holding means to permit displacement of the valve element from its closed position for injection of moulding material at the required injection pressure, said apparatus further comprising an upright cylinder co-axial with said injection tube, means for removably holding said injection tube within said cylinder, a relatively fixed housing surrounding and supporting said cylinder, a bolster member disposed at the end of said housing adjacent said injection nozzle and constituting one of said press members, means adjustably securing said bolster member to said housing to ensure that, when a mould is brought into engagement with the bolster member, said injection nozzle will be properly seated in a sprue opening of the mould, the other of said press members for co-operation with said bolster member comprising a table, a guide extending along said table transversely to the axis of said injection plunger and nozzle, for guiding a mould to and from a moulding position beneath the injection nozzle, stop means for locating the mould in said moulding position and hydraulically operated ram means for moving said table vertically toward and away from said bolster member at the start and finish of a molding operation, said ram means comprising upper and lower co-axial ram cylinders and pistons, a piston rod interconnecting said pistons, and fluid pressure means for operating said ram pistons to effect displacement of said table.

2. Injection moulding apparatus comprising press members for supporting a mould during a moulding operation, injection means including an injection tube having an axial bore for the reception of moulding material and having an outlet for the discharge of moulding material from said bore, an injection nozzle co-axial with said tube for injecting moulding material into a mould, a spacer part located between said tube and said nozzle, said spacer part being formed therethrough with an open-ended passage extending transversely with respect to the axis of said tube and nozzle, said spacer part also being formed with a duct which is in register at one end with said outlet and which opens at its other end into said injection nozzle, a plunger device movable axially in said injection tube for compressing moulding material and urging said material from said tube through said duct and into said injection nozzle, fluid pressure means for actuating said plunger device to force moulding material through said injection nozzle at a required injection pressure, a valve element guided for displacement axially within said injection nozzle to control the passage of moulding material through said nozzle, means for holding said valve element in its closed position, said holding means including a cross-member extending through said transverse passage and operatively engaging said valve element, mechanism for actuating said cross-member, and fluid pressure control means operatively connected to said mechanism for controlling operation of said holding means, said holding means serving to urge the valve element against the pressure of the moulding material and to hold said valve element closed until the required injection pressure has been reached and said control means being operable to release said cross-member to permit displacement of the valve element from its closed position for injection of molding material at the required injection pressure, said valve element comprising a needle valve mounted for free axial floating movement in said nozzle and having at one end a tapered portion presenting a part engageable in the outlet of said nozzle and a part against which moulding material in said nozzle can bear, the other end of said needle valve abutting said cross-member, and said mechanism for actuating said cross-member comprising a first link and lever means operatively connected to one end of said cross-member, a second link and lever means operatively connected to the other end of said cross-member, a first fluid pressure actuated piston device for operating said first link and lever means, a second fluid pressure actuated piston device for operating said second link and lever means, and a control valve for controlling operation of said first and second piston devices, said control valve being operable, when moulding material is subjected by the plunger device to the required injection pressure, to cause said piston devices and the associated link and lever means to release said cross-member and permit opening of said needle valve under pressure of the moulding material in said nozzle.

3. Apparatus as claimed in claim 2, wherein said fluid pressure means for actuating said injection plunger device comprises a cylinder co-axial with said plunger device, means for connecting said cylinder to a source of fluid under pressure, a piston displaceable in said cylinder, a rod connected at one end to said piston and at the other end to said injection plunger device, an end plate closing the end of said cylinder remote from said plunger device, a piston member displaceable in a bore formed in said end plate, means operatively connecting said piston member to said control valve, spring means bearing upon said piston member and adjustable, according to the required injection pressure, to control in a predetermined manner the fluid pressure necessary in said cylinder to displace the piston member for effecting operation of the control valve and opening of the nozzle valve.

4. Apparatus as claimed in claim 3, including fluid pressure compensating means associated with said fluid pressure actuating means of the plunger device and operable, during an injection operation, to maintain the plunger under the required injection pressure.

5. Moulding apparatus comprising an injection press having an upper relatively fixed press member, a lower vertically displaceable press member for cooperation with said upper member to engage and press together co-operating parts of a mould during a moulding operation, injection means including an upright cylinder mounted above said upper press member, an injection tube mounted removably and co-axially within said cylinder, said injection tube having an axial bore for the reception of moulding material and having at its lower end an outlet for the discharge of moulding material from said bore, an injection nozzle disposed below and co-axial with said tube for injecting moulding material into a mould, a spacer part located at the lower end of said cylinder and disposed between said tube and said nozzle, said spacer part being formed therethrough with an open-ended passage extending transversely with respect to the axis of said tube and nozzle, said spacer part also being formed with a duct which is in register at its upper end with said outlet and which opens at its lower end into said injection nozzle, a plunger device movable axially in said injection tube for compressing moulding material and urging said material from said tube through said duct and into said injection nozzle, fluid pressure means for actuating said plunger device to force moulding material through said injection nozzle at a required injection pressure, a valve element guided in an axial bore formed in said spacer part between said transverse passage and said nozzle, said valve element being displaceable axially within said injection nozzle to control the passage of moulding material through said nozzle, means for holding said valve element in its closed position, said holding means including a cross-member extending through said transverse passage for engagement with said valve element, mechanism at opposite ends of said cross-member for actuating said cross-member, and fluid pressure control means operatively connected to said mechanism for controlling operation of said holding means, said holding means serving to urge the valve element against the pressure of the moulding material and to hold said valve element closed until the required injection pressure has been reached and said control means being operable to release said cross-member to permit upward displacement of the valve element from its closed position for injection of moulding material at the required injection pressure.

6. Moulding apparatus according to claim 5 and including, in combination, a device located laterally of said press members for opening and closing a mould to be engaged between said press members, horizontal guide means along which a mould can be guided between said device and said press members, said device comprising relatively fixed upright tubular columns, support posts extending through and slidable vertically in said columns, a vertically displaceable cross member mounted at the upper ends of said posts, arms depending from and pivotally mounted at the opposite ends of said cross member for swinging movement into and from gripping relation with the upper part of a mould located beneath said cross member, means for raising and lowering said posts together with the cross member and the arms carried thereby, means on said guide means for gripping the lower part of a mould during the raising and lowering of the upper part of the mould to open and close the mould, stops on said guide means engageable by a mould to position the mould beneath the cross member, a relatively fixed member supported by said columns in a position spaced above and parallel to said guide means, and ejector pins depending from said member for ejecting moulded articles from the upper part of a mould upon lifting thereof by said pivoted arms.

References Cited in the file of this patent

UNITED STATES PATENTS

| | | |
|---|---|---|
| 1,604,234 | Mead | Oct. 26, 1926 |
| 2,318,031 | Tucker | May 4, 1943 |
| 2,412,671 | Brunner | Dec. 17, 1946 |
| 2,431,843 | Swoger | Dec. 2, 1947 |
| 2,478,013 | Roddy | Aug. 2, 1949 |
| 2,668,325 | Goodwin | Feb. 9, 1954 |
| 2,773,284 | Kelly | Dec. 11, 1956 |

FOREIGN PATENTS

| | | |
|---|---|---|
| 963,619 | France | Jan. 4, 1950 |